Figure 5A:
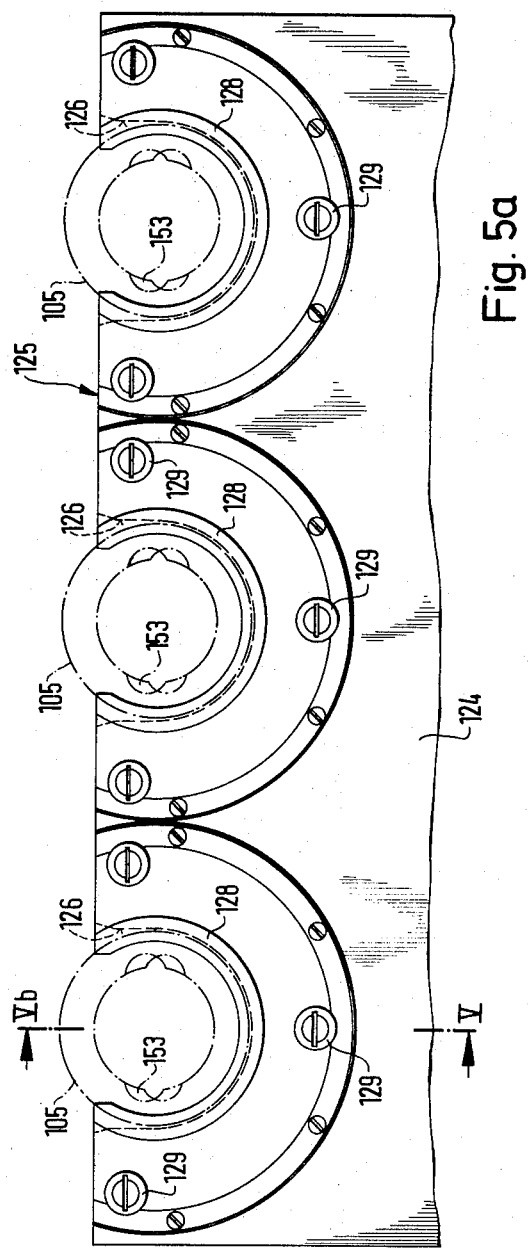

United States Patent [19]
Schubert

[11] 3,799,030
[45] Mar. 26, 1974

[54] APPARATUS FOR PRODUCING GROOVES BY MEANS OF BROACHING TOOLS

[75] Inventor: Ludwig Schubert, Solingen-Ohligs, Germany

[73] Assignee: Oswald Forst GmbH, Solingen, Germany

[22] Filed: Feb. 9, 1972

[21] Appl. No.: 224,870

Related U.S. Application Data

[63] Continuation-in-part of Ser. No. 839,304, July 7, 1969, abandoned.

[30] Foreign Application Priority Data
July 5, 1968 Germany............................ 1752719

[52] U.S. Cl............................. 90/73, 90/76, 90/83, 90/87
[51] Int. Cl............................................. B23d 41/06
[58] Field of Search .............. 90/73, 71, 72, 76, 77, 90/79, 80, 82, 83, 85, 63, 87

[56] References Cited
UNITED STATES PATENTS

| | | | |
|---|---|---|---|
| 2,571,904 | 10/1951 | Lofgren | 90/76 X |
| 2,343,420 | 3/1944 | Podesta | 90/76 X |
| 1,935,551 | 11/1933 | Ferris | 90/80 X |

*Primary Examiner*—Gil Weidenfeld
*Attorney, Agent, or Firm*—Robert H. Jacob

[57] ABSTRACT

The invention concerns a vertical broaching machine in which several work blanks, such as rings, can be simultaneously provided with grooves at one or more broaching positions to which the work blanks, for example rings, are fed into the machine on a feeding device such as a slide onto a transporting device which moves the work blank or blanks to a broaching position where the grooves are formed by means of tools that move downwardly from the top, and after forming of the grooves the blanks are turned by an angle of 120° and are transported either to another broaching position for forming additional grooves or to a discharge device for completely broached blanks.

5 Claims, 14 Drawing Figures

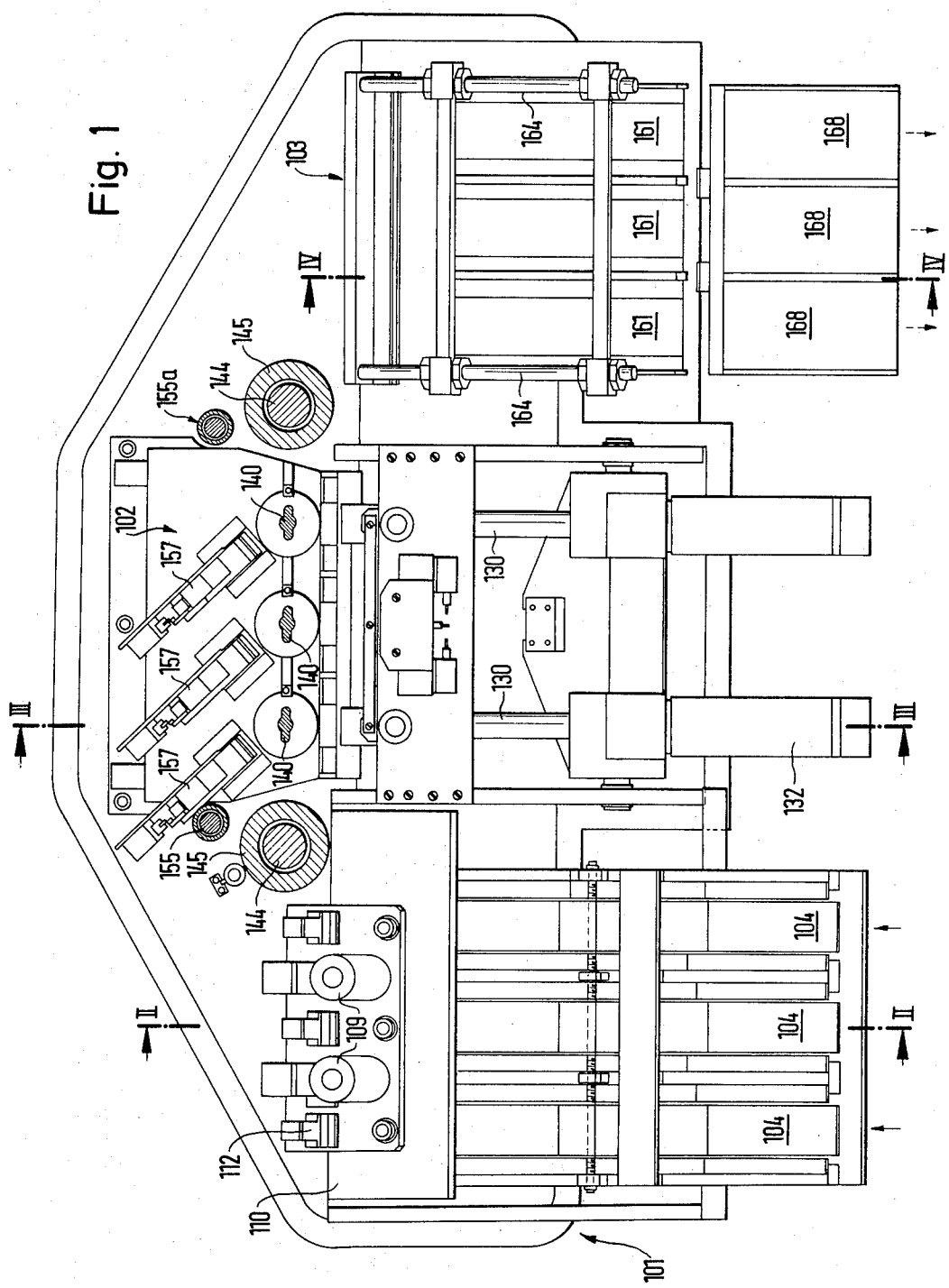

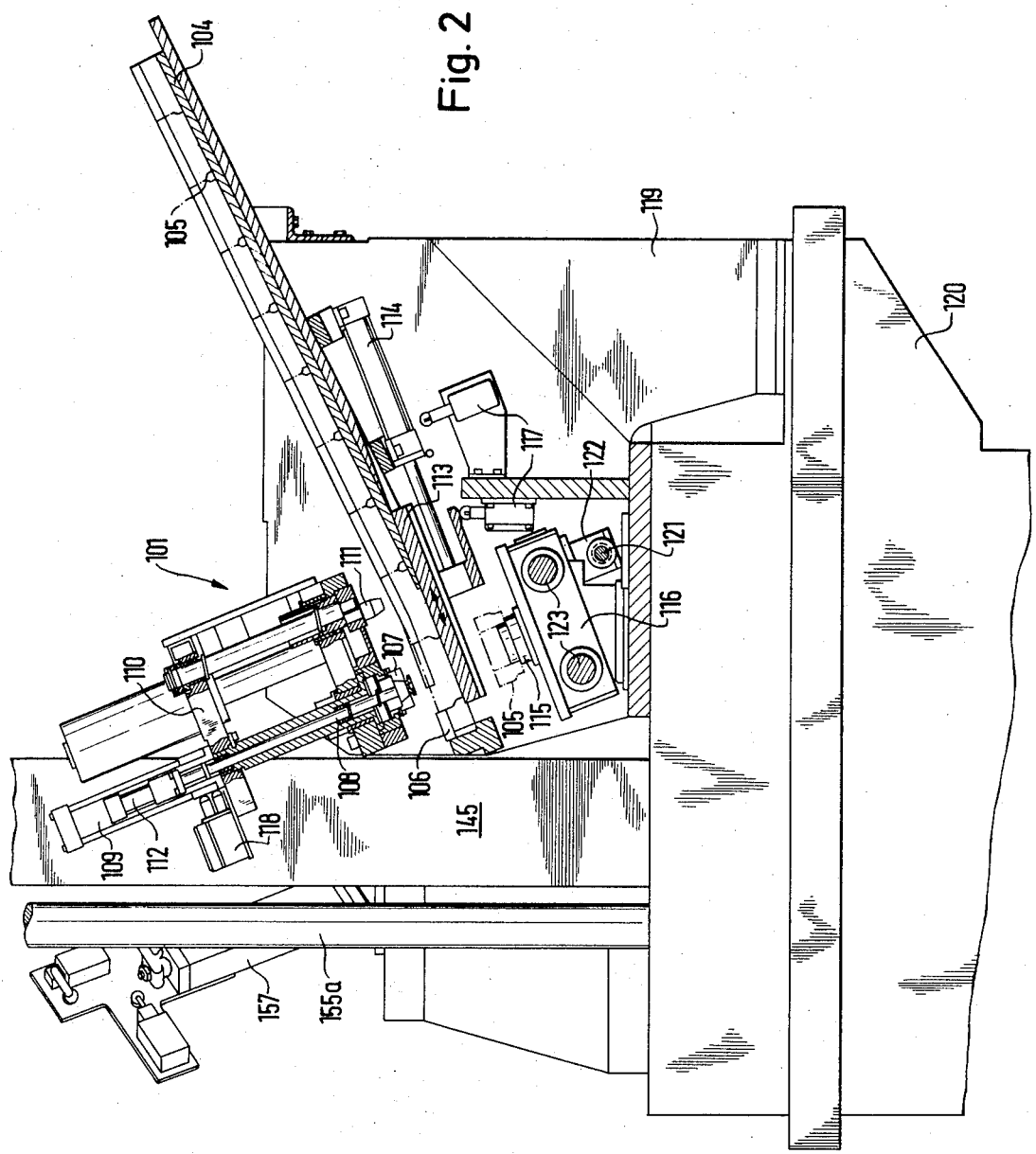

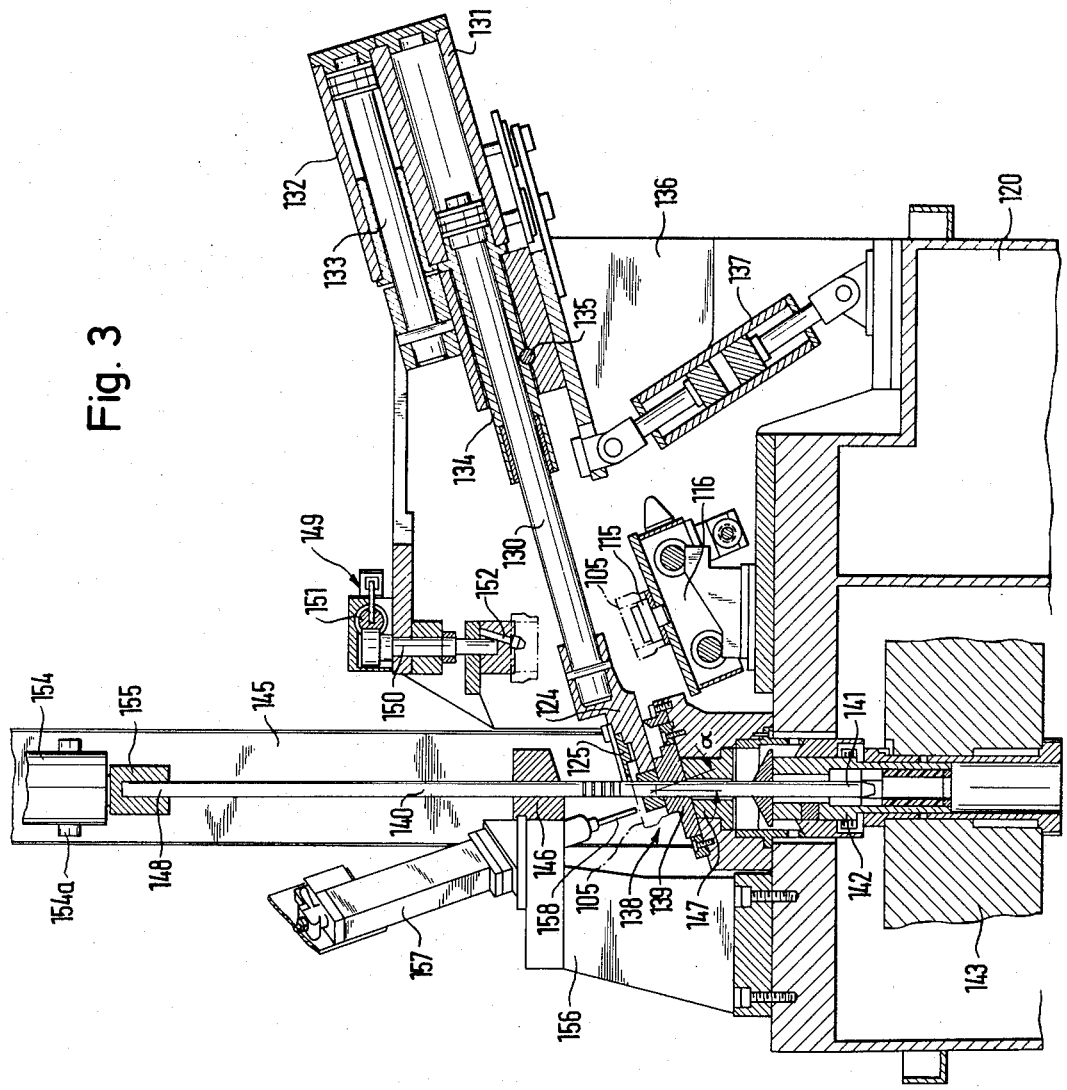

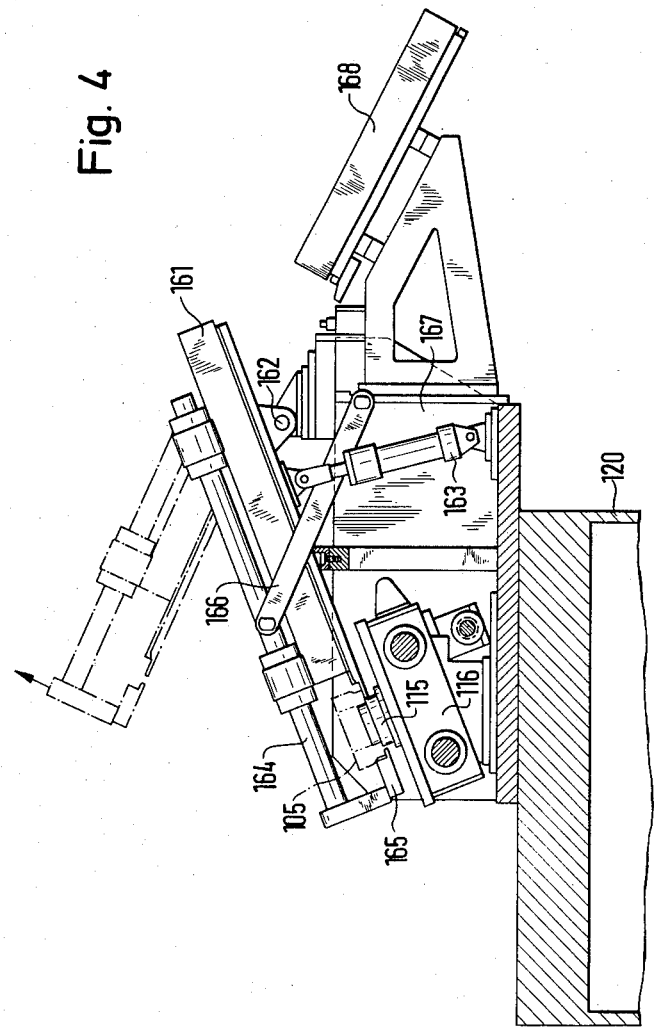

APPARATUS FOR PRODUCING GROOVES BY MEANS OF BROACHING TOOLS

BACKGROUND OF THE INVENTION

The present application is a continuation-in-part application of Ser. No. 839,304 filed July 7, 1969 now abandoned.

The invention relates to apparatus for simultaneously producing grooves in planes that are symmetric to the rotation of work blanks. More in particular the invention concerns a vertical broaching or reaming machine for the simultaneous broaching of two each grooves in the inner or outer rings of homokinetic joints, having altogether six grooves.

Homokinetic joints of this type are known, for example, from U.S. Pat. No. 3,218,827.

Homokinetic joints serve similarly as universal joints for transferring a rotary movement from a rotating element to another element which also rotates, where the axes of rotation of the two rotating parts are not in axial alignment. They comprise essentially an outer ring that is connected to the driven part, for example, wheel of an automobile and an inner ring that is secured to the driving part, such as the drive shaft of the automobile. The inner ring is in the general form of a ball disk so that it can rotate and rock in the outer ring, which on its inside is generally of cylindrical form. In the outer surface of the inner ring and the inner surface of the outer ring, grooves of substantially semi-circular cross-section are provided, while in each groove of the inner ring and the corresponding groove of the outer ring a bearing ball is disposed. These balls are prevented by a ball cage from falling out of the grooves.

Joints of this type possess the great advantage that the driven part does not have a rotary rocking movement superimposed on it as in universal joints, where the superimposed rotational movement depends on the angle between the axis of the driving part and the axis of the driven part. For that reason these joints are called homokinetic joints.

The grooves in the inner and outer rings are not parallel with respect to the axis of rotation, but they are angularly inclined with respect to this axis. Besides, these grooves may always be inclined in the same direction, i.e., they may be inclined parallel to one another or alternatively inclined relative to one another, while the angle of inclination with respect to the axis is of the same amount.

The machine in accordance with the present invention is intended for broaching into the rings grooves that are alternately inclined relative to one another. In particular, six such grooves inclined alternately relative to one another are to be broached in the rings.

Machines are already known by means of which it in the possible by broaching or milling to produce grooves inclined relative to the axis of the work blank in planes that are rotationally symmetric. In the inner surfaces of rotationally symmetric bodies such grooves are also bored into the solid material, and subsequently the inner surfaces are cut by milling or boring. With an angle between the grooves and the work blank that is of an equal amount, but where the grooves are of alternate inclination with respect to one another, such as is the case with the inner and outer rings of known kinetic been driven the work blanks have to be set up anew in the machine for each individual groove. This involves the shortcoming that the idling times, particularly the mounting and re-mounting periods for the work blank, are extremely long in relation to the time of producing the grooves.

SUMMARY OF THE INVENTION

It is therefore an object of the invention to provide a vertical reaming or broaching machine by means of which such grooves can be produced in the inner and outer rings of homokinetic joints.

Accordingly, the invention concerns essentially a vertical broaching machine for the simultaneous broaching of two each grooves in the inner or outer rings of homokinetic joints with a total of six grooves, with a feeding arrangement for rings that are not yet provided with grooves, with a feed slide for transporting at least one ring into one position in front of at least one broaching location having at least one broaching position, in which each ring is worked on by means of a vertically guided reaming tool while inclined at an angle with respect to the horizontal that corresponds to the angle between the plane that is spanned by the two grooves and which corresponds to the axis of the ring, with a gripping and sliding device for transferring the ring or the rings from the transfer slide to the broaching position and from there to a compartment arrangement and/or back to the transfer slide, and with a discharge or delivery device for the completely reamed rings.

Figure 5B:
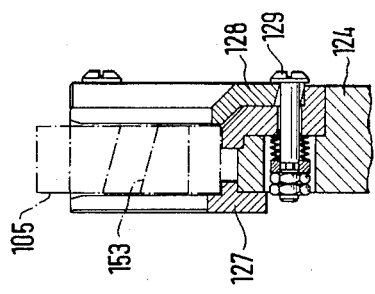
Figure 6C:
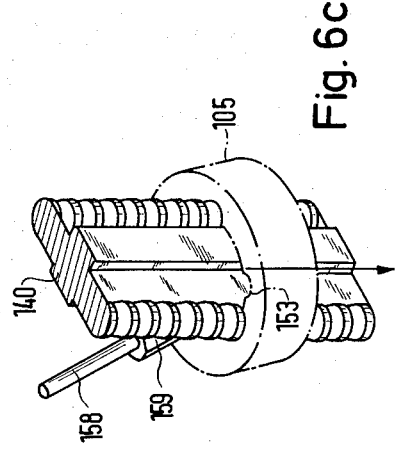
Figure 6B:
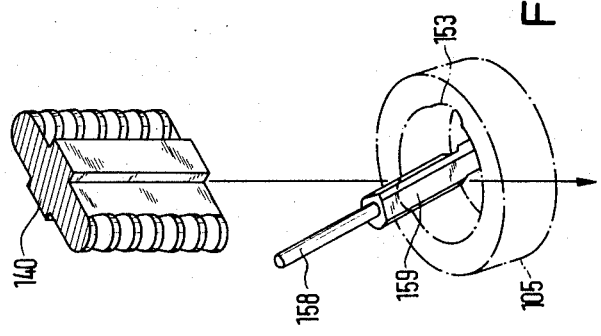
Figure 6A:
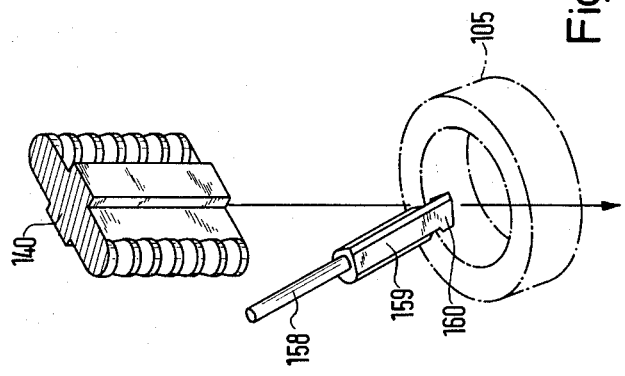
Figure 7:
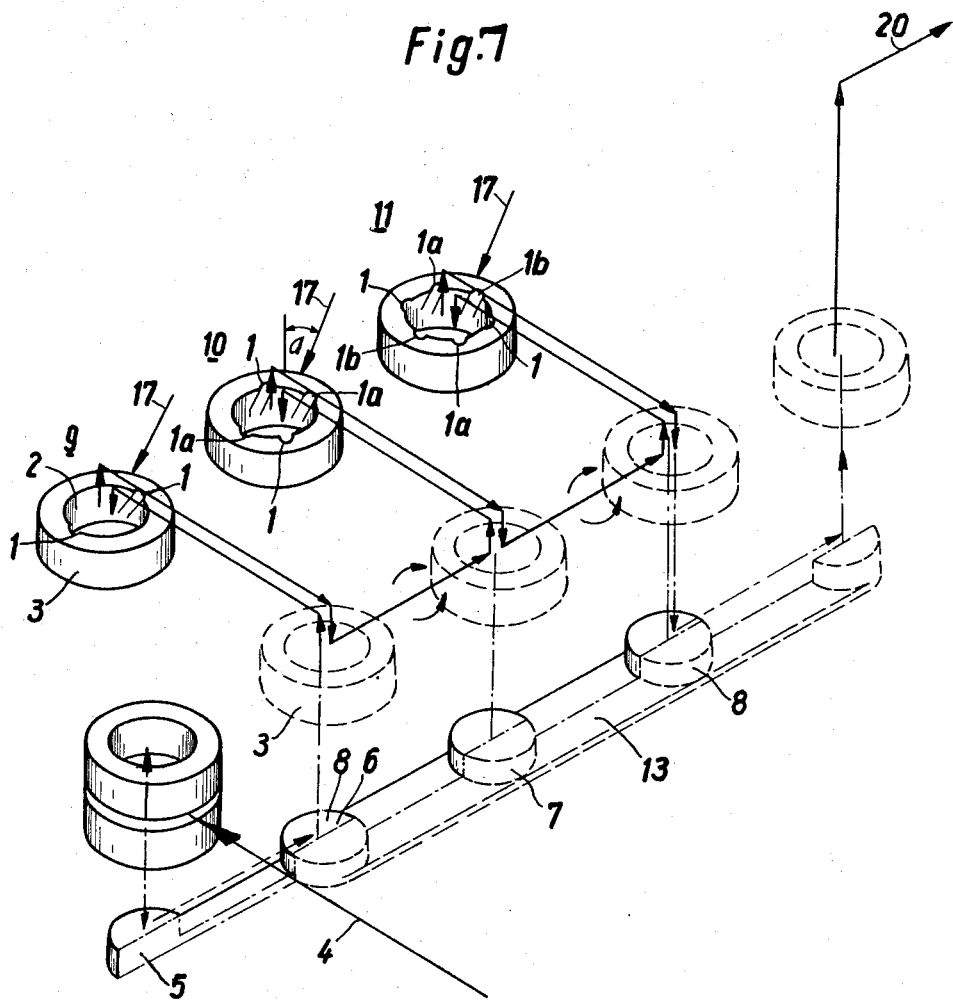
Figure 8:
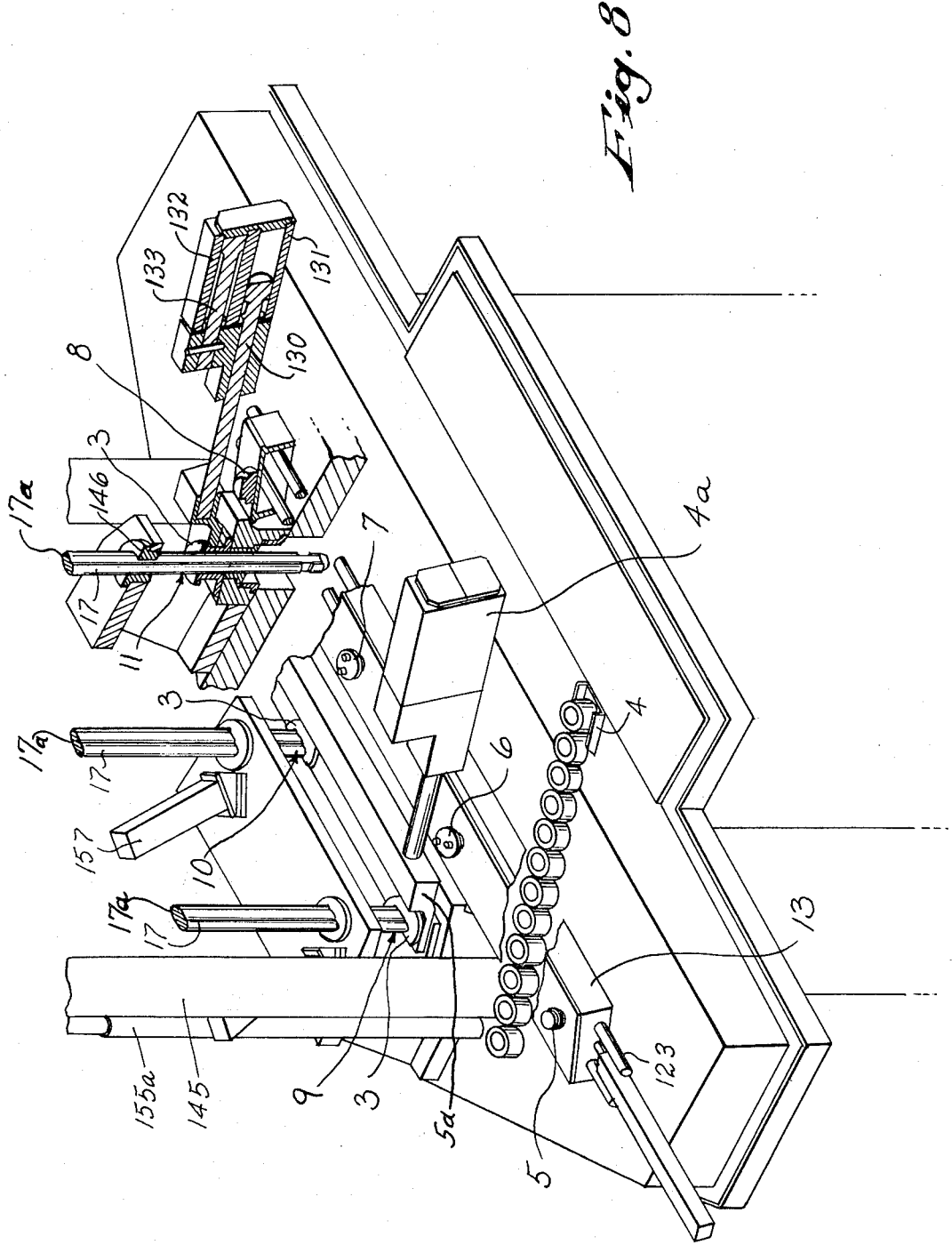
Figure 9:
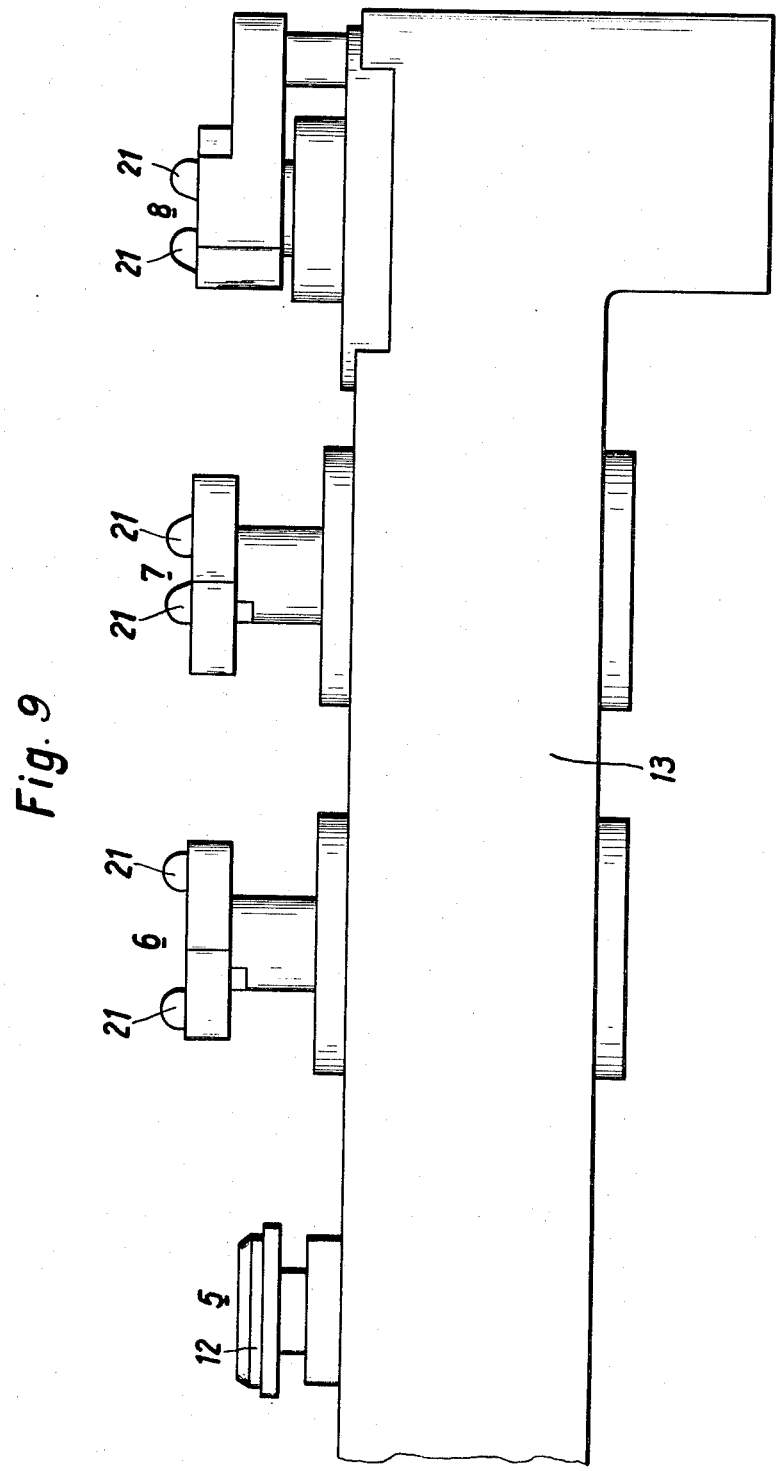
Figure 10:
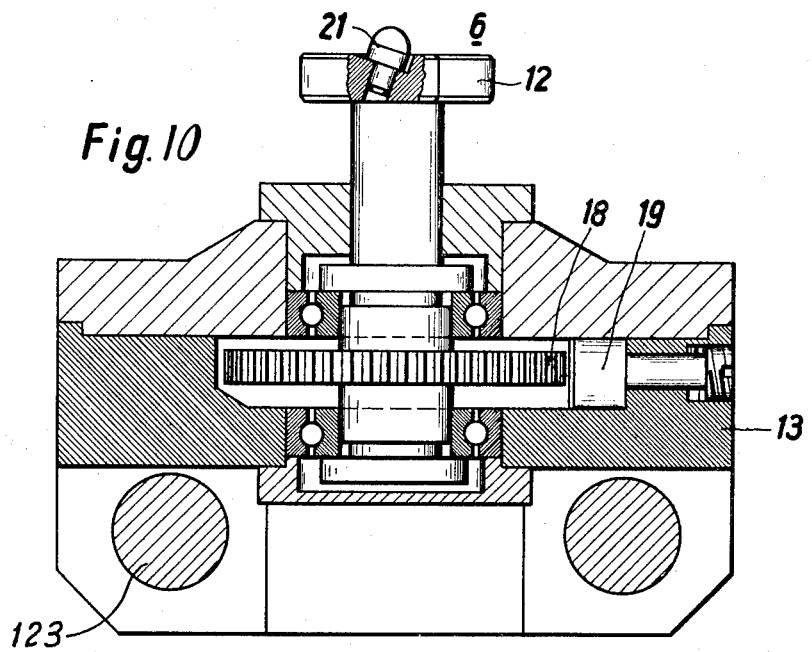
Figure 11:
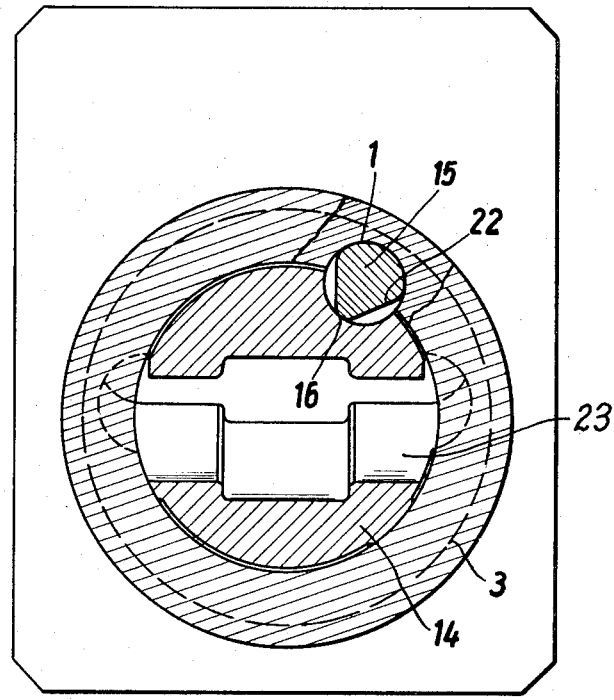

Further details of the invention will become apparent from the following specification with reference to two embodiments illustrated in the drawings, in which FIG. 1 is a plan view of a broaching machine in accordance with the invention, FIG. 2 is a section of the broaching machine taken along line II—II in FIG. 1, FIG. 3 is a section through the broaching machine taken along line III—III in FIG. 1, FIG. 4 is a section through the broaching machine taken along the line IV—IV in FIG. 1, FIGS. 5a and 5b show a top view and a section of three masks in which the rings are received, FIGS. 6a, b and c show an adjusting and setting device for outer rings at the broaching position, FIG. 7 is an operating scheme for a further embodiment of the invention, FIG. 8 shows the embodiment in accordance with FIG. 7 in a perspective view, FIG. 9 is a schematic illustration of a feed slide in the embodiment in accordance with FIGS. 7 and 8, FIG. 10 is a section through a feed slide in accordance with FIG. 9, and FIG. 11 is an illustration of a work blank receptacle taken from the top, partly in section.

DESCRIPTION OF THE INVENTION

FIGS. 1–6 illustrate details of an embodiment in accordance with the invention. FIG. 1 clearly reflects details of the individual operating positions in a plan view. The work blanks are fed in and separated at 101. At 102 they are broached and indexed, and at 103 they are discharged from the machine.

Completely turned work blanks 105 which in the present case are the outer rings of homokinetic joints slide to the separating device 101 by way of three input feed slides 104 arranged alongside one another. The lowermost work blank 105 which in FIG. 2 rests against an abutment 106 is seized by the spreading head 107 of a spreading pin 108. For this purpose a plate 110 is driven downwardly by means of two feed cylinders 109 in which above the three feed slides 104 one each spreading pin 108 is disposed. By these means one each spreading head 107 is pushed into the bore of a work blank 105. Simultaneously the adjacent work blank is held by means of a resiliently supported retaining pin 111 so that it cannot slide. Subsequently, the spreading pin is pushed downwardly by means of a hydraulic actuating cylinder 112 whereby the spreading head spreads open and each clamps itself in the bore of one each work blank 105. Subsequently, a displaceable bottom on which each of the lowermost work blanks 105 are disposed that are held by the spreading head 107 is pulled away to the right by means of the hydraulic cylinder 114 in FIG. 2, so that the work blanks 105 held in the spreading heads 107 are transported downwardly by further actuation of the feed cylinders 109 and can be disposed on the cylindrical guide member 115 of a transfer slide 116. The hydraulic actuating cylinder 112 is now again moved upwardly so that the spreading pin 108 is again driven upwardly whereby simultaneously the spreading head releases itself out of the bore of the work blank. Subsequently the plate 110 with the retaining pin 111 and the hydraulic actuating cylinder 112 are again driven upwardly with the spreading pin 108 and spreading head 107. When they have been driven upwardly far enough, the displaceable bottom is again driven to the left by means of the hydraulic cylinder 114 in FIG. 2. Shortly after that the work blank held by the retaining pin 111 is released so that it can slide downwardly to the abutment 106. This operation repeats itself in the operating cycle of the machine.

The end positions of the hydraulic cylinder 114 are controlled by way of microswitches 117, while microswitches 118 are provided for limiting the movements of actuating cylinders 112.

The entire insertion or feeding device 101 is supported on the bed of the machine 120 by means of side walls 119.

The feed slide 116 is displaceable by means of an hydraulic cylinder of which only the piston rod 121 is illustrated which is in engagement with a block (counter bearing) 122 secured to the feed slide, on two guide bars 123 extending in the longitudinal direction of its movement. As a result of the longitudinal displacement of the transport slide, the three work blanks 105 that are now located thereon are moved to the area of the broaching positions 102 where three work blanks 105 are simultaneously broached. Details are reflected by FIG. 3. Work blanks 105 arriving on the feed slide 116 are seized by three masks 125 located on a plate 124. FIG. 5a illustrates such a plate with three masks 125. Recesses 126 are in the plate which are curved in such a manner that the annular work blanks 105 can be slid in. At the lower side thereof a ring 127 is provided that encompasses the lower border of the work blank so that the work blanks 105 cannot fall downwardly out of the recesses 126. At the top the work blanks are also retained by means of a ring 128 which is pressed against the top of each work blank by means of a resiliently mounted bolt 129, so that it is retained between rings 127 and 128 and cannot accidentally slide out forwardly. The resilient force is so great that under the effect of a force, work blanks 105 can be slid in or withdrawn from the apertures 126.

The plate 124 which carries the masks 125 is secured to two piston rods 130 of two hydraulic actuating cylinders 131. A further hydraulic operating cylinder 132 is fastened to each of these actuating cylinders 131, the piston rods 133 of which are supported in place by means of a guiding member 134 for the piston rods 130 for pivotal movement about an axis 135 by way of side walls 136 upon the bed of the machine 120. The actuating cylinders 131 and the hydraulic operating cylinders 132 are axially displaceable with respect to the guiding member 134 and can be pivotally moved about the axis 135. For pivotal movement about this axis 135 a double acting thrust cylinder 137 is provided by means of which the masks 125 on the piston rods 120 can be turned about the axis 135.

After three work blanks 105 have arrived from the insertion means 101 upon the transport slide 116 in front of the broaching devices 102, they are seized by the masks 125. For this purpose the actuating cylinders 131 and the hydraulic operating cylinders 132 are moved to their outermost right position while each piston 130 is fully entered in the associated actuating cylinder 131. In this connection, the thrust cylinder 137 is in its lowermost position. By actuating the operating or working cylinder 132, whose piston rod 133 is fixedly positioned at its outer free end, the actuating cylinder 131, the hydraulic operating cylinder 132, and thereby its piston rod 133, are moved so far to the left that the work blanks 105 upon the guide members 115 of the feed slide 116 slide into the recesses 126 of the masks 125. Subsequently the lifting cylinder 137 is actuated so far that the piston rods 130 are moved into a somewhat higher position than that illustrated in FIG. 3. Subsequently the actuating cylinder 131 is operated in a manner that its piston rod 130 is completely pushed out of it. By subsequent minor lowering of the lifting cylinder 137 the masks with the work blanks are deposited at the broaching positions 138. In this connection the work blanks are supported upon a work blank device 139. A broaching tool 140 is passed from the top through each work blank 105 at a broaching position and is seized with its shaft 141 by a shaft holder 142. This shaft holder 142 is equipped in a manner known per se in accordance with German Industry Norms (DIN) 1418. All three shaft holders 142 are secured to a pull plate 143 which is moved downwardly by the piston rods 144 of two hydraulically actuated main cylinders 145. During this broaching operation the broaching tool is guided on both sides of the broaching position 138 in an upper broaching tool guide means 146 and a lower broaching tool guide means 147. The upper end member 148 of the broaching tool 140 is not held during the actual broaching operation. Each broaching tool 140 is completely pulled through the work blank 150 to be broached. Subsequently the lifting cylinder 137 is raised somewhat, and then the piston bar 130 is moved into the actuating cylinder 131. Thereupon the lifting cylinder 137 is completely extended, so that the masks 125 with the work blanks 105 reach a compartment arrangement 149. In the compartment arrangement 149 a shaft 150 is provided for each work blank 105 in a mask 125, which shaft is pivotally movable about its longitudinal axis by a rack bar 151 that is longitudinally movable. Two fingers 152 are provided at the lower end of each shaft which enter into two oppositely disposed grooves 153 that have already been broached, and thereby rotate the work blank as the shaft 150 rotates 120°.

Simultaneously with the dividing of the work blanks, a feed slide 154 guided by means of rollers 154a is driven downwardly between the two main cylinders 145 on which an end member holder 155 for each broaching tool 140 is provided, that is known per se from the German Industry Norms. Simultaneously the lower shaft holder is again moved upwardly so far that the end portion 148 of the broaching tool extends above the upper tool guiding means 146. Here the end member holder 155 seizes the end portion 148 of the broaching tool 140 and pulls it completely upwardly, while the shaft holder 142 is released. The broaching tool is pulled upwardly so far that it is still guided in the upper tool guide 146. The movement of the supply slide is effected by way of hydraulically actuated feed cylinders 155a.

Subsequently the work blanks in the masks 125, turned by 120°, are brought back to the same broaching position 138. Now the broaching tools 140 are lowered and their shafts 141 are seized between shaft holders 142. Then there follows a new broaching operation.

As shown particularly in FIG. 3, the work blanks 105 are inclined at the broaching positions by an angle $\alpha$ with respect to the longitudinal direction of the broaching tools 140, so that due to the fact that two grooves 153 are simultaneously broached on each work blank 150, grooves are formed which are alternately inclined toward one another on the inner surface of the work blank.

At the support 156 by way of which each upper work blank guide means 146 is supported with respect to the machine bed 120, a hydraulic fixing cylinder 157 is provided for each broaching position 138 which on its piston rod 158 has a prismatic wedge 159, shown more in detail in FIG. 6. Each prismatic wedge 159 is so formed that it presents an inclined surface 160 in the region of its free end which engages the inner wall of a work blank 105 prior to the first broaching operation, as illustrated at the left of FIG. 6. When one or two pairs of inclined grooves 153 have been broached, the prismatic wedge is slid to a large extent into one of the grooves 153 that has already been broached prior to the beginning of the second or third broaching operation. By means of this design of the prismatic wedges 159 it is accomplished that during the first broaching operation the work blank 105 is centered as a unit at the work blank abutment 139 while it is aligned tangentially by the inclined surface 160 on the prismatic wedge 159. During the second and third broaching operation on each work blank 105 this work blank is again centered as a unit by the work blank abutment 139 and is likewise held tangentially by the prismatic wedge, while the radial centering and the tangential supporting take place without tolerances. For this purpose it is appropriate when the prismatic wedge 159 is not in engagement with the complete surface of a groove 153, but when only an engagement exists along two points or two straight lines, because in this manner accurate centering is possible. FIG. 6 also shows of what shape the cross-section a broaching tool 140 is, so that it can be pulled through the inner bore of a work blank 105 which is held by a prismatic wedge 159. This form of construction, where each work blank 105 at a broaching position 138 is provided with six grooves 153 by means of the same broaching tool 140, is of advantage for the reason that with the inevitable tolerances of the broaching tools, all grooves will have the same tolerances.

After the third broaching operation, which is the last, the work blanks 105 are again seated on the guide members 115 of the feed slide 116. This slide is moved to the right, while simultaneously three new work blanks 105 are brought from the feeding device 101 to the broaching means 102. The work blanks 105 which have been completely broached are now moved to the discharge means 103, which is shown more in detail in FIG. 4. For each of the three work blanks 105 a pivotable discharge slide 161 is provided, which slides are connected with one another and rockable about a common axis 162. The rocking into position, which is illustrated in dash lines in the drawing, is effected by means of a raising cylinder 163. An axially guided bar 164 is provided on each side parallel to the discharge slides, which bars are provided at their front ends with a claw 165 for the work blanks. Furthermore, links 166 are connected to the slide bars 164 which at their other ends are linked to the supporting structure 167. When the discharge slides 161 are rocked upwardly about the axis 162 by means of the raising cylinders 163, the slide bars 164 are displaced to the right relative to the discharge slides 161, whereby the claws 165 that reach below the work blanks 105 push the work blanks 105 onto the discharge slides 161. From there they slide in the raised position of the discharge slides 161 out of the machine by way of the inclined slide racks 168.

In the embodiment described above the number of the broaching positions 138 is not limited. It may be smaller or also larger than three, and the number of the feed slides 104 and of the discharge slides 161 varies accordingly and is equal to the number of the broaching positions. The number of the guide members 115 on the feed slide 116 is twice as large as the number of the broaching positions 138, because simultaneously with the feeding of unworked work blanks 105 from the feed means 101 to the masks 125, completely broached blanks are moved to the discharge device 103.

The embodiment in accordance with FIGS. 7–11 differs from the embodiment described above only as to a few features, which do not need to be described in detail. In principle, this other embodiment operates in a manner that at each broaching position only the first or second or third broaching operation is undertaken on one work blank, and that between two broaching operations the work blank is conducted to the next broaching position while turning through an angle of 120°. The turning of the work blank by 120° is here effected on the feed slide. With this embodiment only one input slide and one output slide is required.

FIG. 7 illustrates a cycle of working operations, where work blanks 3 which consist of the outer ring for a homokinetic joint that has also been prepared in finished form is deposited by way of a feed slide 4 upon a forwarding device 5 of a transport slide 13 of a feeding means. Four forwarding devices 5 to 8 are disposed at equal distances from one another upon the transport slide 13, the two center ones of which are in the form of compartment (index) devices described more in detail below.

By sliding the transport slide 13 in FIGS. 7 and 8 to the right the forwarding element 5 reaches a position in front of the first clearing position 9. Simultaneously a work blank 3 that is already provided with a pair of inclined grooves 1 arrives in front of the second broaching position 10 and a third blank having already two inclined grooves 1, 1a in front of the third broaching position 11. The blanks on the forwarding devices 6, 7 moved opposite the second and third broaching positions, respectively, are each turned through an angle of 120° during this transporting operation.

The work blanks are simultaneously lifted up by equally shaped and simultaneously driven masks 5a and transported to the three broaching or clearing positions 9, 10 and 11 and broached there while they are inclined at an angle $\alpha$ relative to the axis of the broaching tools 17.

The centering and tangential positioning of each work blank 3 on the work blank receptacles 14 (FIG. 11) takes place by way of a prismatic wedge 15 introduced from the top, whose two prism surfaces 22 engage a semi-circular recess 16 of the work blank receptacles 14, and which with its other surface is pressed either against the inner surface 2 of the work blank 3 (broaching position 9) or in grooves 1, 1a (broaching position 10 or 11), while here suitably only one engagement of the prismatic wedges 15 with respect to the surface of a groove 1, 1a takes place along two points or two straight lines. Since the work blank receptacle 14 is inclined by the angle $\alpha$ with respect to the horizontal, the recess 23 in the work blank receptacle through which each broaching tool 17 is moved is suitably illustrated in the perspective in FIG. 11.

Each broaching tool 17 is fed vertically from the top to the corresponding work blank 3. After passing the work blank shaft through the bore of blank 3, it is seized by a shaft retainer disposed below the work blank receptacle 14, and the broaching tool 17 is pulled through the work blank 3 while two grooves 1, 1a, 1b disposed opposite one another are broached. Each broaching tool 17 is pulled completely through the work blank 3, while at the end of the broaching operation the connection between the upper end part of the work tool and the corresponding end member retainer is released, so that the work blank 3 is again free.

Then all three work blanks 3 are raised from the work blank receptacles 14 by means of masks 5a and returned to the transport slide 13, where they are deposited on the guide members 6, 7, 8. Guide stubs 21 are provided on the guide members 6, 7, 8 which already engage the broached grooves 1, 1a, 1b, and thus retain the work blanks 3 in an exactly determined position (FIG. 9).

Subsequently the transport slide 13 is moved so far to the right that one each work blank 3 arrives in front of an adjacent broaching location. During the further movement of the transport slide 13 a pinion 18 provided on the guide members 6, 7 rolls upon a stationary toothed bar 19, whereby these guide members are turned through an angle of 120° together with the work blanks 3 located thereon. The toothed bar 19 is secured in place with respect to the machine bed in a manner not illustrated. While a work blank 3 is moved from its position opposite the first broaching location 9 to its position opposite the second broaching position 10, a new work blank is moved in position opposite the first broaching position 9. Simultaneously the work blank 3 already provided with six grooves 1, 1a, 1b, is advanced to the right from its position in front of the last broaching position 11 to the discharge slide, such as illustrated and described in connection with FIG. 4.

This arrangement makes it possible to simultaneously work on three work blanks during one operating cycle, so that for each cycle one work blank is completed. For each movement of the transport slide 13 four work blanks 3 are moved. The first work blank is moved in a position opposite the first broaching position 9, the second into a position opposite the second broaching position 10, and the third work blank into a location opposite the third broaching position 11, while the fourth work blank is discharged.

The course of the method and the broaching machines required therefor is fundamentally the same for the production of ball races in the ball grooves of homokinetic joints and the same as in the two embodiments illustrated and described, while merely the work blank receptacles and the broaching tools proper are suitably changed in their form of construction.

It is also pointed out that in FIG. 8 additional reference numerals have been inserted and correspond to equivalent parts in FIGS. 1 to 6.

Having now described the invention with reference to the embodiments illustrated, what I desire to protect by letters patent is set forth in the appended claims.

I claim:

1. In a vertical broaching machine for simultaneously broaching grooves in rings of homokinetic joints, wherein two grooves are simultaneously broached in each of three successive operations on each ring and where the plane extending through the two simultaneously broached grooves and the axis of the rings are disposed at an angle $\alpha$ relative to one another; said machine comprising a base, at least one broaching station including a vertically guided broaching tool, transport slide means for feeding said rings to said broaching station, input feeding and separating means to supply said rings to said transport slide means, work blank receiving means below said tool to support a ring in a position inclined at said angle $\alpha$ relative to the horizontal, prismatic wedge means tangentially engagable with said rings and cooperating with said work blank receiving means to radially center said rings thereon, said broaching tool having two cutting portions thereon to simultaneously broach two grooves in each of said rings, seizing and displacement means operative to transfer each ring from said transport slide means to said work blank receiving means at the broaching station and to lift each ring after each broaching operation from the work blank receiving means and to move the ring after the first and second broaching operations to an indexing means operative to turn the ring by an angle of 120° and to return each ring after the third operation to said transport slide means to be deposited thereon, and discharge slide means to which the finished broached ring is moved by said transport slide means.

2. In a vertical broaching machine in accordance with claim 1, wherein cylindrical guide members are provided on said transport slide means for retaining said rings.

3. In a vertical broaching machine in accordance with claim 2, wherein ring retaining masks are provided with said seizing and displacement means, and hydraulic cylinders are associated with said masks for moving said masks horizontally and vertically.

4. In a vertical broaching machine in accordance with claim 1, where said input feeding and separating means comprises at least one feed slide and a spreading head above said at least one feed slide adapted to place a ring upon said transport slide means.

5. In a vertical broaching machine in accordance with claim 1, comprising three broaching stations each having a vertically guided broaching tool.

* * * * *